Figure 1:
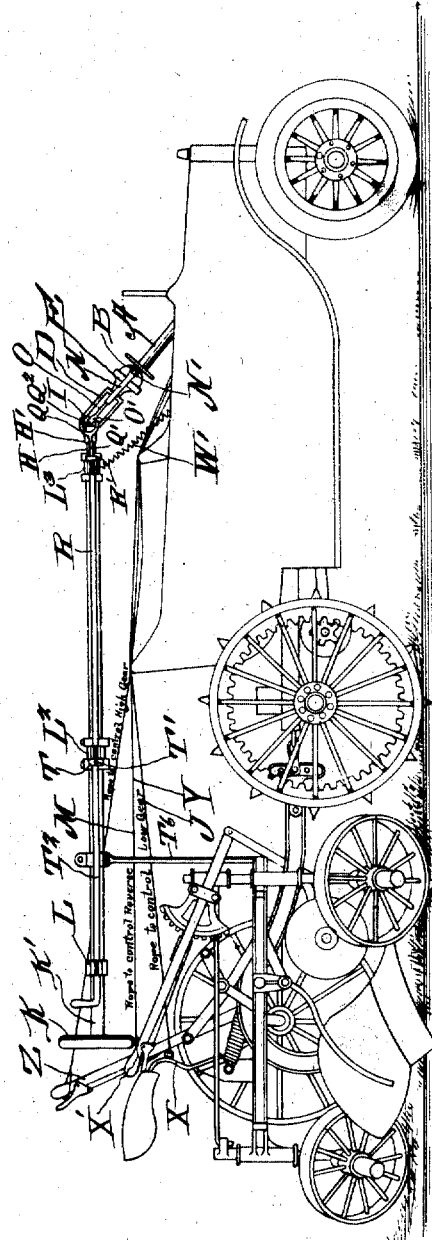

L. MONSON.
EXTENSION STEERING DEVICE FOR TRACTORS AND AUTOMOBILES.
APPLICATION FILED MAR. 8, 1918.

1,275,071.

Patented Aug. 6, 1918.
2 SHEETS—SHEET 1.

Witnesses

Inventor
L. Monson,
By Franklin N. Hough
Attorneys

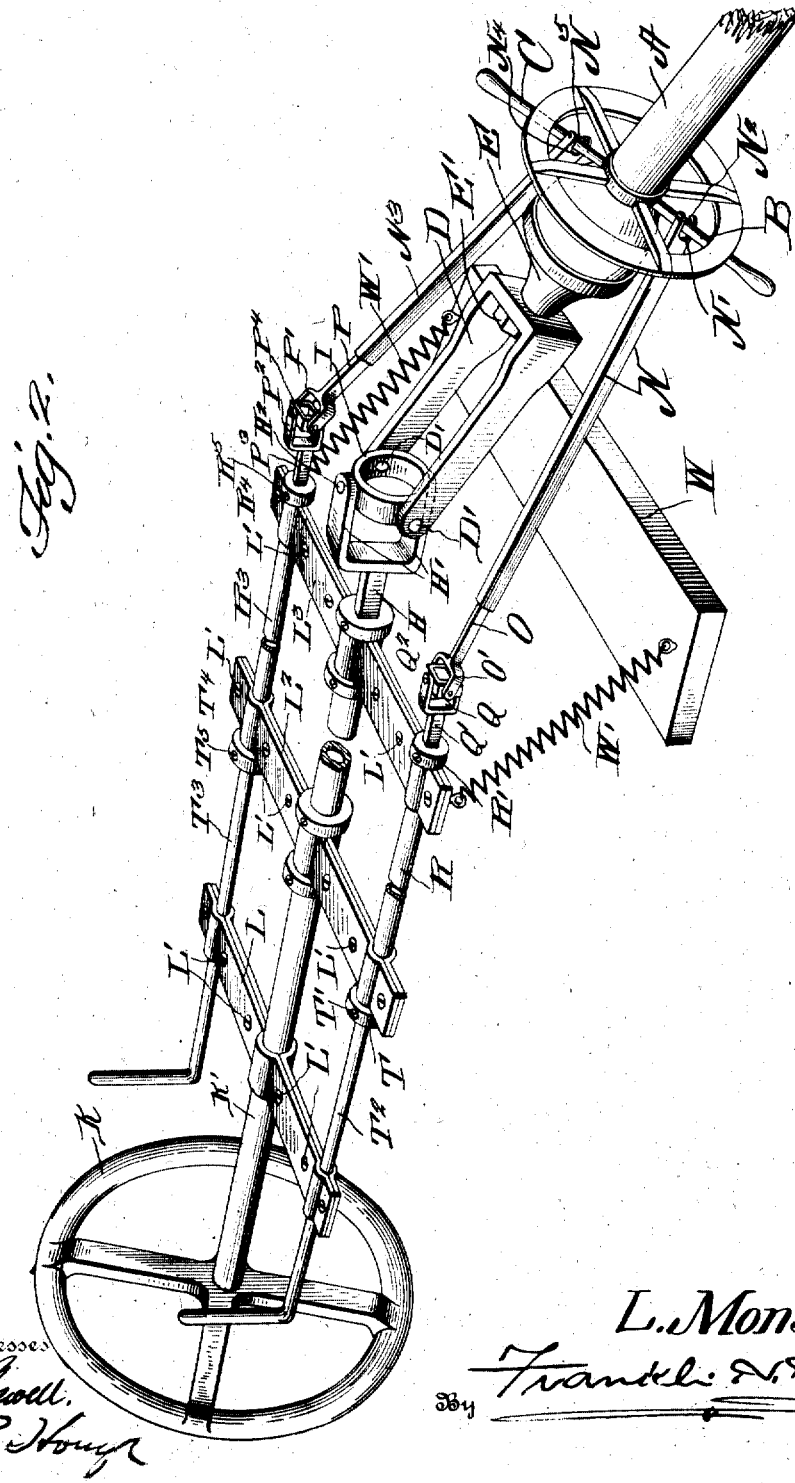

UNITED STATES PATENT OFFICE.

LEWIS MONSON, OF DECORAH, IOWA.

EXTENSION STEERING DEVICE FOR TRACTORS AND AUTOMOBILES.

1,275,071.    Specification of Letters Patent.    Patented Aug. 6, 1918.

Application filed March 8, 1918. Serial No. 221,175.

*To all whom it may concern:*

Be it known that I, LEWIS MONSON, a citizen of the United States, residing at Decorah, in the county of Winneshiek and State of Iowa, have invented certain new and useful Improvements in Extension Steering Devices for Tractors and Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in extension steering device for tractors for use in connection with automobiles, and consists of a means whereby he control of the automobile may be within convenient reach of the operator of the tractor.

The invention consists of further details of construction combinations and arrangements of parts which will be hereinafter fully described, shown in the accompanying drawings and then specifically defined in the appended claims.

I illustrate my invention in the accompanying drawings which, with the letters of reference marked thereon, form a part of this specification and in which:

Figure 1 is a view in elevation showing the tractor and automobile connected thereto and illustrating the application of my steering mechanism, and Fig. 2 is an enlarged detail perspective view of the extension steering mechanism.

Reference now being had to the details of the drawings by letter:

A designates the steering post of an automobile and provided with the usual fuel control lever B and a spark controlled lever C. A yoke D is fastened through the medium of a screw upon the steering head E, said screw being engaged by a nut E'. The yoke has universal connection with the fork end H' of the bar H consisting of a cylindrical member I having pivotal connection through the medium of the pins D' with the yoke D, and also with the forked end H' of said bar through the medium of the pivotal pins H². A steering wheel K is fixed to the tubular shell K' which is journaled in suitable bearings in the plates L, L² and L³, which are fastened together by means of screws L'. An angular outlined shell N has a slotted end N' adapted to receive the control lever B which is held therein by means of the pin N² and a similar angular outlined shell N³ has a slotted end N⁴ adapted to receive the control lever C and is held in place by a pin N⁶. An angular outlined bar O telescopes within the shell N and is extensible to adapt the same to be applied to the steering mechanism of different makes and sizes and has a forked end O' having universal connections with the forked end Q of a square outlined bar Q' through the medium of the square outlined member Q² to which the forked ends of the two bars Q and Q' are pivotally connected. An angular outlined bar P telescopes within the shell N³ and has a forked end P' having universal connection with the forked end P² of an angular outlined bar P³ through the medium of the square outlined member P⁴ with which the two forked ends P² and P³ are pivotally connected.

A tubular shell R is mounted in suitable bearings within the plates L, L² and L³ and has a collar R' fastened thereto by means of set screws and each collar has an angular outlined opening adapted to receive a similar shaped bar Q'. A similar shell R³ is journaled in suitable bearings in the plates L, L² and L³ and has a collar R⁴ fastened thereto by a set screw R⁵ and which collar R⁴ has an angular outlined opening conforming to the shape of the bar P³ which passes through the same and telescopes within the shell R³. A collar T is held by a set screw T' to the shell R and has an angular outlined opening in which the angled rod T² has a telescoping movement. A similar angled rod T³ engages an angled opening in the collar T⁴ held by a set screw T⁵. The two rods T² and T³ are journaled in suitable bearings in the plates L, L² and L³ and the angled ends of the rods are connected within convenient reach of the steering wheel K. A board W adapted to be fastened to the seat of the automobile is connected by coiled springs W' with the ends of the plates L, L² and L³, and serves as a means for holding the bearings in which the shell A' is mounted in a level position.

A control rope J is secured at one end to the support for the seat and its other end is adapted to be connected to the control for the low gear upon the engine, while a second rope Y connects with the reverse control of the machine at one end and its other end fastened to the seat at X'. A third rope M is fastened to the high gear control and also to the lever Z of the tractor.

A forked rod T⁶ is adapted to be fastened to tractor and its branching arms form a means for supporting the rods T² and T³.

In operation, when it is desired to steer the automobile, it may be done through the medium of the wheel K which has universal connection with the steering head. When it is desired to actuate one or the other of the control levers B or C, one to regulate the supply of fuel and the other the sparking, it may be done by rocking one or the other of the shafts T² or T³ which, through the universal connections with the bars O and P respectively, may cause one or the other of the hollow shells N or N³, having notched ends, to throw one lever or the other. It will be noted that the notched ends of the hollow shells N and N³ engage the levers at locations short distances from the angled portions of the levers which pass down through the steering post and thereby, when the shells N are turned through the medium of the angular bars or shafts O, will cause the levers to turn in one direction or the other.

By the provision of the construction, the extension steering device may be easily and quickly applied to various types of automobiles, parts being adjustable to adapt the same for ready attachment.

What I claim to be new is:

1. An extension steering device for tractors of automobiles, comprising in combination with a steering head and wheel of an automobile, control levers, said head having an extension at the upper end thereof, an auxiliary steering shaft and wheel having universal jointed connection intermediate the same and said extension of the steering head, members having notched ends engaging the control levers, and means having universal jointed connections with said members for actuating the control levers.

2. An extension steering device for tractors of automobiles, comprising in combination with a steering head and wheel of an automobile, control levers, said head having an extension at the upper end thereof, a yoke secured to said extension of the head and provided with arms, an auxiliary steering shaft and wheel having universal jointed connection with the arms of said yoke, members having notched ends engaging the control levers, and rods having universal jointed connections with said members.

3. An extension steering device for tractors, comprising in combination with the steering head and wheel of an automobile, with an extension upon the upper end of said head, a yoke secured to said extension having arms, an auxiliary steering shaft and wheel fixed thereto, and suitable bearings for said auxiliary shaft, rocking control actuated levers journaled in suitable bearings, hollow shells having notched ends engaging the control levers upon the steering wheel, rods telescoping said shells and having universal jointed connections with said rocking control actuated levers.

In testimony whereof I hereunto affix my signature in presence of two witnesses.

LEWIS MONSON.

Witnesses:
JOHN FAGERLIN,
GERLIK HAMMERSNER.